C. C. SAVERY.
Fluting-Iron.

No. 162,104.                               Patented April 13, 1875.

Witnesses:                                Inventor:
Benj Morison                              Charles C. Savery
Wm H. Morison.

UNITED STATES PATENT OFFICE.

CHARLES C. SAVERY, OF PHILADELPHIA, PENNSYLVANIA, ASSIGNOR TO PURVES & SAVERY, OF SAME PLACE.

IMPROVEMENT IN FLUTING-IRONS.

Specification forming part of Letters Patent No. 162,101, dated April 13, 1875; application filed March 30, 1875.

*To all whom it may concern:*

Be it known that I, CHARLES C. SAVERY, of the city of Philadelphia, in the State of Pennsylvania, have invented an Improved Hand Implement for Fluting and Smoothing Textile Fabrics, of which the following is a specification:

The object of my invention is to afford a fluting implement provided with two series of different-sized fluting ridges and grooves, and carrying within it a changeable heater, the said implement being provided with a fixed handle, and adapted to be used with facility and accuracy upon a bearing, provided with two series of grooves and ridges, corresponding with the two series of ridges and grooves, respectively, of the said implement; and so, also, that the said implement can be handled (with its heater attached) with rapidity and accuracy in the operation of fluting and smoothing, as will be fully and clearly described, with reference to the accompanying drawing, in which—

Figure 1:
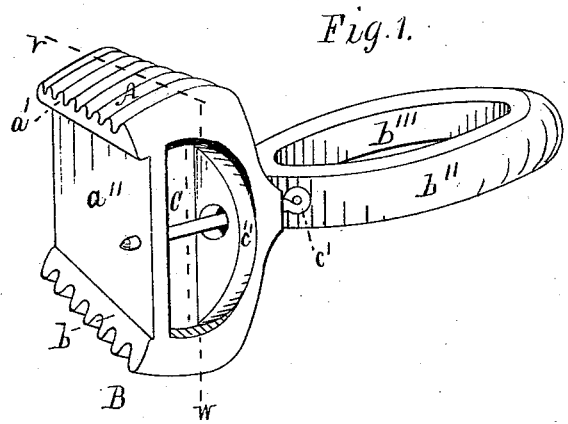
Figure 2:
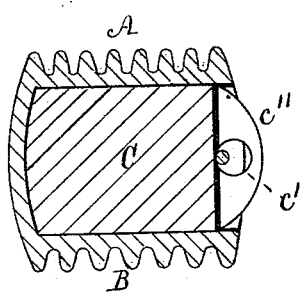
Figure 3:
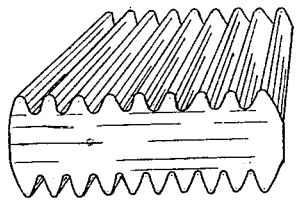

Figure 1 is a perspective view of my said hand implement; Fig. 2, a vertical transverse section of Fig. 1, on the right-hand side of the dotted line $v$ $w$ on said Fig. 1; and Fig. 3 is a perspective view of the bearing upon which the implement, Fig. 1, co-operates in forming and smoothing the flutes in the fabric intended to be fluted and smoothed.

The implement is cast of iron or any other suitable metal, in the form shown in Figs. 1 and 2, with the two series of alternating grooves and ridges A and B, the one series, A, being of smaller grooves and ridges than the other, B, and both series curved longitudinally and transversely, as shown. Both series project in a sloping manner, as shown, at their respective outer ends $a'$ and $b'$ over the flat recessed end $a''$, as shown in Fig. 1, for the purpose of enabling the operator, in using the implement, to see the said ends without stooping over the implement for the purpose. The body of the implement is cast hollow, and with one side fully open, for the reception and withdrawal of the heating-block C, which fills the said hollow space when inserted, and is held therein by means of a draw-pin, $c'$, which, when inserted, secures the heated block C in place by having passed through appropriate holes in the head and a corresponding larger hole in the handle $c''$ of the said heating-block, previously heated sufficiently to heat the grooves and ridges A and B to a temperature about that required in the ordinary smoothing-irons. The handle $b''$ has an oblong opening, $b'''$, for the purpose, mainly, of rendering the implement lighter in weight, and affording a more easy command of the same in using. The ridges and grooves of both series A and B are ground and polished smooth, so as to slip freely and smoothly over the fabric being operated upon, (not shown;) and as the heater C becomes too much cooled, it is readily withdrawn by any suitable poker, and a sufficiently heated one substituted. The bearing-block, Fig. 3, is simply a flat oblong block of iron or wood, with alternating ridges and grooves on its two opposite flat surfaces, to correspond, respectively, with the grooves and ridges A and B shown in Fig. 1. The said ridges and grooves are also ground and polished smooth.

The mode of using my said implement upon the bearing-block, Fig. 3, for the purpose of fluting and smoothing the required fabric, is as follows, viz: The heater C, having been brought to the proper degree of heat, is inserted into the hollow or open space in the implement, and secured by means of the draw-pin $c'$; and the implement thus becoming sufficiently heated, the one end of the fabric to be fluted and smoothed is placed upon the first two ridges and grooves so as to cross them, and the corresponding first two grooves and ridges of the implement, Fig. 1, pressed directly down upon the said fabric, thus pressing the latter down over the ridges and into the grooves; and, finally, the implement is drawn along over the fabric to the rear or near ends of the said ridges and grooves of the bearing-block, Fig. 3, and at the same time pressed downward by means of the handle $b''$, and also the said handle gradually raised sufficiently to bring the outer ends of the ridges and grooves (A or B, as the case may be) into the same sliding contact with the fabric which is between the implement and the bearing-block, so as to successively bring the whole length of the ridges and grooves of the former into smoothing action upon the fabric. The thus fluted end of the fabric is then lifted and moved longitudinally across the ridges and grooves of the bearing-block—say, the distance required for the next flute desired in the fabric—the flute previously formed in said fabric resting closely on the succeeding ridge of the bearing. The implement is again applied, and the second flute made in the fabric, and so on until the desired number of flutes are produced in said fabric. The whole series of the ridges and grooves of either of the two sizes used is used at the same time; and, consequently, as the fabric is moved along, each flute made will be pressed and smoothed as many times as there are ridges and grooves in the series used of the said implement.

It will be readily understood without further explanation that the implement described and shown in Figs. 1 and 2, being comparatively light in weight, and carrying its heater C within it, will afford greater facility and rapidity in use than any other publicly known or used for the purpose upon a stationary bearing provided with ridges and grooves.

I claim as my invention—

A fluting-iron consisting of the two series of ridges and grooves A and B, projecting over the recess $a''$, the handle $b''$, and the removable heater C, secured within the head of the implement by the draw-pin $c'$, the said parts being constructed and arranged to operate in connection with any suitably-constructed bearing-plate, for the purpose specified.

CHARLES C. SAVERY.

Witnesses:
BENJ. MORISON,
WM. H. MORISON.